United States Patent Office 3,178,485
Patented Apr. 13, 1965

1

3,178,485
THERMAL HYDRODEALKYLATION OF ALKYL AROMATICS
John W. Myers, Bartlesville, Okla., assignor to Phillips Petroleum Company, a corporation of Delaware
No Drawing. Filed Dec. 6, 1961, Ser. No. 157,566
2 Claims. (Cl. 260—672)

This invention relates to the thermal hydrodealkylation of alkyl aromatics. More particularly, it relates to a process for the thermal hydrodealkylation of alkyl aromatics, such as toluene, in admixture with an oxygen-substituted organic compound.

There is increased interest and activity today in the chemical and allied industries in the production of aromatics such as benzene and naphthalene. Attention has been given in particular to the catalytic hydrodealkylation of alkyl aromatics for the production of these valuable aromatics. But these catalytic processes entail the use of expensive catalysts and give rise to the attendant problems of coke laydown, "dusting," catalyst fines separation, and catalyst deactivation, and require large quantities of hydrogen for efficient operation. On the other hand, the thermal (or non-catalytic) hydrodealkylation of alkyl aromatics has generally required large reactors and severe operating conditions.

Accordingly, an object of this invention is to provide an improved process for the thermal hydrodealkylation of alkyl aromatics. Another object is to provide a process for the hydrodealkylation of alkyl aromatics which is not subject to the disadvantages of catalytic hydrodealkylation. Another object is to provide an improved thermal hydrodealkylation process characterized by high rates of reaction, thus permitting the use of smaller reactors and/or less severe operating conditions than that found necessary in hydrodealkylation processes used or proposed heretofore. Further objects and advantages of this invention will become apparent to those skilled in the art from the following discussion and appended claims.

The present invention provides a process wherein an alkyl aromatic such as toluene, in admixture with an oxygen-substituted organic compound, such as acetone, is subjected to thermal hydrodealkylation conditions. I have found that the reaction rate of the dealkylation reaction is significantly increased due to the presence of the oxygen-substituted organic compound in the feedstock. Such increased reaction rate results in a more economical operation since for the same size reactor and same operating conditions, faster reaction rates (i.e., greater conversions of alkyl aromatics) can be obtained by this invention as compared to thermally hydrodealkylating the alkyl aromatic in the absence of such oxygen-substituted compounds.

The term "oxygen-substituted organic compound," as used in this specification and in the appended claims is meant to cover those organic compounds wherein one or more oxygen atoms are bonded by a single or double bond to a carbon atom of the hydrocarbon residue. The oxygen atom can be substituted in the form of a hydroxyl, oxy, carbonyl, or peroxy radical. These oxygen-substituted organic compounds are normally liquid and generally have from 1 to 10 carbon atoms per molecule. One or more of these oxygen-substituted organic compounds can be admixed with the alkyl aromatic feed, the preferred oxygen-substituted organic compounds being those which are acyclic and do not violently decompose under the reaction conditions.

Representative oxygen-substituted organic compounds which can be used in the practice of this invention include monohydric aliphatic alcohols, such as methyl alcohol, ethyl alcohol, n-propyl alcohol, isopropyl alcohol, allyl alcohol, n-butyl alcohol, isobutyl alcohol, n-amyl alcohol, isoamyl alcohol, n-hexyl alcohol, cyclohexanol, n-octyl alcohol, capryl alcohol, n-decyl alcohol, and the like; polyhydric aliphatic alcohols, such as ethylene glycol, propylene glycol, glycerol, trimethylene glycol, and the like; monocarboxylic aliphatic acids, such as formic acid, acetic acid, propionic acid, n-butyric acid, isobutyric acid, n-valeric acid, caproic acid, n-heptylic acid, caprylic acid, pelargonic acid, and the like; esters of such carboxylic acids, such as methyl formate, ethyl formate, methyl acetate, ethyl acetate, n-propyl acetate, n-butyl acetate, n-amyl acetate, n-octyl acetate, ethyl propionate, isoamyl n-butyrate, ethyl n-heptylate, and the like; anhydrides of such carboxylic acid, such as acetic anhydride, propionic anhydride, n-butyric anhydride, n-valeric anhydride, and the like; aldehydes, such as acetaldehyde, chloral glyoxal, propionaldehyde, n-butyraldehyde, isobutyraldehyde, n-valeraldehyde, acrolein, crotonaldehyde, benzaldehyde, furfural, and the like; ketones, such as acetone, methyl ethyl ketone, methyl n-propyl ketone, diethyl ketone, hexanone-2, hexanone-3, methyl t-butyl ketone, di-n-propyl ketone, diisopropyl ketone, acetylacetone, and the like; ethers, such as dimethyl ether, methyl ethyl ether, diethyl ether, di-n-propyl ether, methyl n-butyl ether tetrahydrofuran, anisole, and the like; peroxy compounds, such as tert-butyl peroxides, tert-butyl hydroperoxide, benzoyl peroxide, benzoyl hydroperoxide, dicumyl peroxide, cumyl hydroperoxide, diisopropyl benzene peroxide, diisopropyl benzene hydroperoxide, di-tert-butyl peroxide, and the like. Oxygen-substituted organic compounds having mixed oxygen-containing functional groups can also be used, such as methyl cellosolve, dihydroxyacetone, β-hydroxypropionic acid, γ-acetoxybutyraldehyde, paraformaldehyde, β-hydroxy-n-butyraldehyde, ethyl-n-butylacetoacetate, o-hydroacetophenone, and the like.

The amount of oxygen-substituted organic compound used in the practice of this invention can vary, and, stated functionally, the amount generally used will be sufficient to increase the reaction rate, i.e., conversion of alkyl aromatic to lower molecular weight aromatic. Usually this amount will be less than 15 weight percent of the alkyl aromatic, preferably 0.5 to 10 weight percent of the alkyl aromatic feed. The oxygen-substituted organic compound can be mixed with the alkyl aromatic and the mixed feed then preheated and vaporized, or the oxygen-substituted compound and alkyl aromatic can be separately preheated and vaporized prior to admixture. The feedstock of vaporized alkyl aromatic and oxygen-substituted organic compound, having temperatures generally about 1050–1300° F., typically about 1100° F., can then be supplied together with a hydrogen-containing stream, such as reformer offgas, also preheated to about the same temperatures to a hydrodealkylation reactor. Such a reactor can be a tubular type reactor lined with Gunite and provided with ceramic pipe internals. The reactor can be operated at about 100 to 2000 p.s.i.a., typically about 200–600 p.s.i.g. The hydrogen-to-alkyl aromatic mol ratio can vary between 0.5/1 to 20/1, preferably about 3/1 to 8/1. The hydrodealkylation reaction is exothermic and non-catalytic, the reaction temperatures generally being about 1100–1500° F., typically about 1100–1300° F. The reactor effluent can be cooled, for example by admixture with cooled recycle aromatic product, to about 800–1100° F., and then further cooled by using suitable coolers such as air fin-coolers. The reaction mixture, comprising the aromatic product in admixture with methane, hydrogen, and other reaction products, such as biphenyl, can then be subjected to conventional separation to recover the aromatic product.

Due to the presence of the oxygen-substituted organic compound in the alkyl aromatic feedstock, the reaction rates of conversion will be significantly increased, so that smaller reactors and/or less severe operating conditions can be employed than that encountered heretofore.

My invention is applicable in dealkylating alkyl aromatics in general, in particular alkyl benzenes, the latter term being used herein in its generic sense to cover mono-alkyl benzenes and poly-alkyl benzenes. Representative alkylbenzenes which can be used as feeds include toluene, xylene, ethylbenzene, diethylbenzene, cumene, propylbenzene, isopropylbenzene, diisopropylbenzene, butylbenzene, amylbenzene, mesitylene, methyl-ethylbenzene, pseudocumene, hemimellitene, prehnitene, durene, and the like, including mixtures of hydrocarbons containing one or more of these compounds. The mono-nuclear alkyl aromatics, especially toluene and xylene, are preferred. Mono- and polyalkylated naphthalenes, such as methyl naphthalene, can also be dealkylated to the corresponding aromatic by the practice of this invention.

The objects and advantages of this invention are further illustrated in the following examples, but it should be understood that the various reactants, conditions, etc., recited in these examples should not be construed to limit unduly this invention.

A number of runs were made in which feedstocks containing toluene and an oxygen-substituted organic compound of this invention were subjected to hydrodealkylation conditions. For purposes of comparison, toluene was hydrodealkylated in another run in the absence of any oxygen-substituted oragnic compound. Data for these runs, together with the percent toluene conversion and percent dealkylation efficiency, are set forth and compared in Table I. These runs were carried out in a stainless steel reaction tube heated in an electric furnace. The products were analyzed by chromatography.

*Table 1*

| Run | 1 | 2 | 3 | 4 |
|---|---|---|---|---|
| Oxygen compound used | none | acetone | isopropanol | di-t-butyl peroxide |
| Amt. of oxygen compound, wt. percent [a] | | 6.3 | 6.4 | 6.4 |
| Reaction temp., °F | 1,143 | 1,146 | 1,140 | 1,141 |
| Reaction pres., p.s.i.g | 300 | 300 | 300 | 300 |
| $H_2/HC$ [b], mol ratio | 4.1 | 4.0 | 3.9 | 4.2 |
| Contact time, sec | 31 | 31 | 31 | 31 |
| Toluene conversion, percent | 12.9 | 29.2 | 21.8 | 34.4 |
| Dealkylation efficiency, percent | 98.8 | 98.8 | 93.5 | 96.4 |

[a] Based on toluene.
[b] HC includes oxygen compound where used.

Comparison of the runs in Table I show that a significant increase in reaction rate can be obtained by incorporating in the alkyl aromatic feeds an oxygen-substituted organic compound of this invention.

Various modifications and alterations of this invention will become apparent to those skilled in the art, without departing from the scope and spirit of this invention, and it should be understood that this invention is not to be limited unduly to that set forth herein for illustrative purposes.

I claim:

1. In a non-catalytic hydrodealkylation process wherein hydrogen and a vaporized alkyl aromatic hydrocarbon feed stream are passed to a reaction zone, said hydrocarbon is dealkylated in said zone at 1100 to 1500° F., and the resulting dealkylated aromatic product is recovered from the reaction mixture withdrawn from said zone, the improvement comprising admixing with said feed stream 0.5 to 15 weight percent thereof of an acyclic alcohol and passing it in vaporized form with said hydrocarbon to said zone, said alcohol being normally liquid and having 1 to 10 carbon atoms per molecule.

2. The process according to claim 1 wherein said alkyl aromatic hydrocarbon is toluene, and said oxygen-substituted organic compound is isopropanol.

References Cited by the Examiner
UNITED STATES PATENTS

| | | | |
|---|---|---|---|
| 2,739,991 | 3/56 | Hervert | 260—672 |
| 2,768,219 | 10/56 | Hoffmann et al. | 260—672 |
| 2,786,873 | 3/57 | Ohsol et al. | 260—672 |
| 2,801,271 | 7/57 | Schlatter | 260—672 |
| 3,110,745 | 11/63 | Peck et al. | 260—672 |

OTHER REFERENCES

Brooks et al.: The Chemistry of Petroleum Hydrocarbons," vol. 2, pp. 140, 155 and 251 (1955), Reinhold Publ. Co.

Gilman: "Organic Chemistry," vol. I, pages 538–9, (1938), John Wiley and Sons, Inc. (N.Y.).

ALPHONSO D. SULLIVAN, *Primary Examiner.*

PAUL M. COUGHLAN, Jr., *Examiner.*